United States Patent
Ducharme et al.

[19]

[11] Patent Number: 6,100,540
[45] Date of Patent: Aug. 8, 2000

[54] LASER DISPLACEMENT MEASUREMENT SYSTEM

[75] Inventors: Alfred D. Ducharme, Tewksbury; Peter N. Baum, Chelmsford, both of Mass.

[73] Assignee: Visidyne, Inc., Burlington, Mass.

[21] Appl. No.: 09/255,114

[22] Filed: Feb. 22, 1999

[51] Int. Cl.$^7$ .............................. G01C 3/08; G01B 11/24
[52] U.S. Cl. ..................... 250/559.38; 356/5.11
[58] Field of Search ............... 250/559.38; 356/3.01, 356/4.01, 4.03, 4.1, 5.09, 5.11, 5.15, 141.1

[56] References Cited

U.S. PATENT DOCUMENTS

| | | | |
|---|---|---|---|
| 4,297,030 | 10/1981 | Chaborski | 356/5.15 |
| 5,204,732 | 4/1993 | Ohmamyuda et al. | 356/5.11 |
| 5,904,170 | 8/1999 | Berg et al. | 356/5.1 |

*Primary Examiner*—Stephone B. Allen
*Attorney, Agent, or Firm*—Iandiorio & Teska

[57] ABSTRACT

A laser displacement measurement system including a radiation source for transmitting radiation to a target, an R.F. transmitter oscillator for modulating the amplitude of the radiation at a first frequency, a detector for sensing the radiation reflected from the target, an R.F. local oscillator for providing an R.F. signal at a second frequency, a first mixer circuit, responsive to the oscillators for providing a local I.F. signal which is the difference between the first and second frequencies, a second mixer circuit, responsive to the detector and the R.F. local oscillator, for providing a reflected I.F. signal which is the difference between the second frequency and the modulation frequency of the reflected radiation, and a phase detector, responsive to the local and reflected I.F. signals, for detecting a first phase difference between the signals representative of the distance of the target.

11 Claims, 3 Drawing Sheets

LASER DISPLACEMENT MEASUREMENT SYSTEM

FIELD OF INVENTION

This invention relates to a laser displacement measurement system and more particularly to such a system which permits high precision measurement of displacement and absolute range.

BACKGROUND OF INVENTION

Conventional laser displacement measurement systems compare the phase shift of a modulated reflected laser beam, with respect to the modulated transmitted laser beam, to determine the displacement or range of a target.

These systems incorporate a radiation source which transmits radiation towards a target, where the radiation is reflected off the target and detected by a radiation detector. The transmitted signal is then compared with the received signal to determine the amount of phase shift between the two signals, which corresponds to the range of the target.

Since light travels at a finite speed, it takes a fixed amount of time for radiation to travel from the transmitter to the object being scanned and back to the detector. This finite amount of time induces a phase shift in the received beam which, as stated above, corresponds to the distance the target is from the transmitter. However, problems are encountered when the phase shift is greater than one period of the transmitted beam, since this makes it difficult to obtain the actual range of the target. Therefore, the modulation frequency of the radiation source is often chosen so that the wavelength of the modulation frequency is equivalent to the maximum range determinable by the measurement system. For example, if the wave propagating through free space at the speed of light has a wavelength of 100 meters, the maximum range of the measurement system would be 50 meters.

This leads to a system in which the lower the modulation frequency of the transmitted radiation, the longer the wavelength and, therefore, the longer the range. However, as the wavelength is increased, the system accuracy is decreased. Additionally, once the amount of phase shift is in excess of one period, ambiguity arises in determining the absolute range (i.e. distance to target) of the target being scanned. However, the system is still able to determine displacement (i.e. movement of the target) relative to the initial position of the target. This displacement measurement will function regardless of the fact that the system cannot determine the absolute range of the target.

In order to compensate for these shortcomings, systems have been designed which utilize multiple radiation sources, radiation detectors, and optical scan paths. This enables the system to use lower frequency, longer wavelength radiation to determine a coarse range and a higher frequency, shorter wavelength radiation beam to determine a fine range. However, these systems are overly complex as they require, essentially, two complete independent laser displacement measurement systems combined into one device, where the output of these two systems is then combined to generate an absolute range. Additionally, there is a substantial increase in the cost and the size of these systems, as they require redundant optics and electronics in order to function properly and the cost of high-speed electronics capable of processing high-frequency modulation signals is substantial.

SUMMARY OF INVENTION

It is therefore an object of this invention to provide an improved laser displacement measurement system which is simple in design and low in cost.

It is a further object of this invention to provide such a system which provides high precision output without the need of expensive high-speed processing components.

It is a further object of this invention to provide such a system which reduces the necessary optics.

It is a further object of this invention to provide such a system which requires only one optical path.

It is a further object of this invention to provide such a system which utilizes adjustable oscillators to enable determination of absolute range while utilizing only one optical path.

This invention results from the realization that an improved high precision laser displacement measurement system can be effected by using a second oscillator signal to generate an intermediate frequency (IF) signal, when mixed with the laser output modulation signal, so that an extremely high frequency modulating signal can be used to obtain high precision while the phase difference signal, which represents the phase difference between the transmitted and reflected radiation, can be processed at much lower I.F. frequencies using more reliable, less costly components.

This invention features a laser displacement measurement system including: a radiation source for transmitting radiation to a target; an R.F. transmitter oscillator for modulating the amplitude of the radiation at a first frequency; a detector for sensing the radiation reflected from the target; an R.F. local oscillator for providing an R.F. signal at a second frequency; a first mixer circuit, responsive to the oscillators, for providing a local I.F. signal which is the difference between the first and second frequencies; a second mixer circuit, responsive to the detector and the R.F. local oscillator, for providing a reflected I.F. signal which is the difference between the second frequency and the modulation frequency of the reflected radiation; and a phase detector, responsive to the local and reflected I.F. signals for detecting a first phase difference between the signals representative of the distance of the target.

In a preferred embodiment, the laser displacement measurement system may include a controller for selectively changing the frequency of both oscillators by the same amount from the first and second frequencies to a second set of frequencies. The controller may include a range detector, responsive to the first phase difference, the first and second frequencies, and the second set of frequencies, for calculating the absolute range of the target. The range detector may include means for determining the first phase difference between the local and reflected I.F. signals at the first and second frequencies, means for determining a second phase difference between the local and reflected I.F. signals at the second set of frequencies, and means for calculating the absolute range of the target. The second set of frequencies may include a third and fourth frequency and the first frequency may be 1000.00 Mhz, the second frequency may be 1004.50 Mhz, the third frequency may be 1010.10 Mhz, and the fourth frequency may be 1014.60 Mhz. The means for determining the first phase difference may include means for commanding the oscillators to the first and second frequencies, and means for reading the first phase difference. The means for determining the second phase difference may include means for commanding the oscillators to the second set of frequencies, and means for reading the second phase difference. The means for calculating the absolute range of the target may include means for incrementing the second phase difference by one if the first phase difference is greater than the second phase difference. The range detector may be a software routine.

This invention features a laser displacement measurement system including: a radiation source for transmitting radiation to a target; an R.F. transmitter oscillator for modulating the amplitude of the radiation at a first frequency; a detector for sensing the radiation reflected from the target; an R.F. local oscillator for providing an R.F. signal at a second frequency; a first mixer circuit, responsive to the oscillators, for providing a local I.F. signal which is the difference between the first and second frequency; a second mixer circuit, responsive to the detector and the R.F. local oscillator, for providing a reflected I.F. signal which is the difference between the second frequency and the modulation frequency of the reflected radiation; a phase detector, responsive to the local and reflected I.F. signals, for detecting a first phase difference between the signals representative of the distance of the target; and a controller for selectively changing the frequency of both oscillators by the same amount from the first and second frequencies to a second set of frequencies.

In a preferred embodiment, the controller includes a range detector, responsive to the first phase difference, the first and second frequencies, and the second set of frequencies, for calculating the absolute range of the target.

DISCLOSURE OF PREFERRED EMBODIMENT

Other objects, features and advantages will occur to those skilled in the art from the following description of a preferred embodiment and the accompanying drawings, in which.

Figure 1:
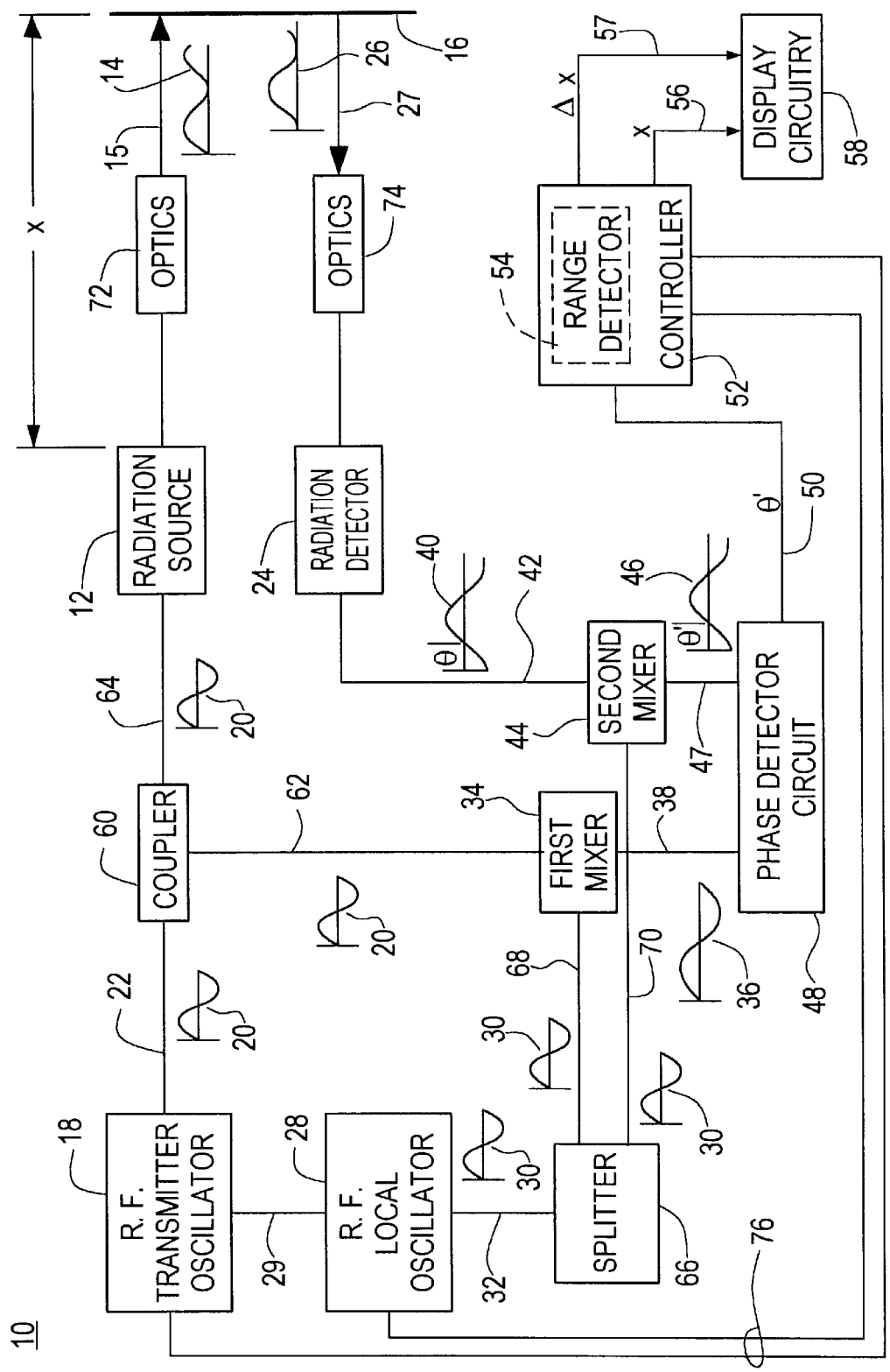
FIG. 1 is a diagrammatic view of a laser displacement measurement system according to this invention.

In accordance with this invention, the laser displacement measurement system 10, FIG. 1, includes a radiation source 12 for transmitting radiation 14 via beam 15 to target 16. A radio frequency (R.F.) transmitter oscillator 18 provides a modulation signal 20 on line 22. An electronic coupler 60 splits modulation signal 20 into two signals on lines 62 and 64 which are provided to first mixer circuit 34 and radiation source 12 respectively. Radiation source 12 produces modulated radiation 14. A typical frequency for modulation signal 20 is 1000 Mhz. A typical embodiment of R.F. transmitter oscillator 18 is a phase lock loop such as National LMX 1501. A detector 24 senses reflected modulated radiation 26 reflected via beam 27 from target 16. Transmitting optics 72, between transmitter 12 and object 16, focus transmitted beam 15 and receiving optics 74 focus reflected beam 27. An R.F. local oscillator 28 provides an R.F. signal 30 on line 32 at a second frequency. The phase of transmitter oscillator 18 and local oscillator 28 are locked via phase lock line 29. An electronic splitter 66 provides R.F. signal 30 to first mixer circuit 34 and second mixer circuit 44 on lines 68 and 70 respectively. A typical frequency for R.F. signal 30 is 1004.5 Mhz. As with R.F. transmitter oscillator 18, a typical embodiment of R.F. local oscillator 28 is a phase lock loop such as National LMX 1501. A first mixer circuit 34, responsive to oscillators 18 and 28, provides a local I.F. signal 36 on line 38, having a typical frequency of 4.5 Mhz, which is the difference between modulation signal 20 and R.F. signal 30. Radiation detector 24 provides a reflected modulation signal 40 on line 42 which is similar to that of modulation signal 20, with the addition of a finite amount of phase shift, $\theta$. A second mixer circuit 44, responsive to detector 24 and R.F. local oscillator 28, provides a reflected I.F. signal 46 on line 47, having a typical frequency of 4.5 Mhz, which is the difference between R.F. signal 30 and reflected modulation signal 40. Reflected I.F. signal 46 contains a phase shift, $\theta'$, which is the fractional period equivalent to that of the phase shift, $\theta$, of reflected modulation signal 40. Therefore, if high frequency reflected modulation signal 40 has a phase shift, $\theta$, which is equivalent to 0.10 period, lower frequency reflected I.F. signal 46 would have the same fractional phase component, $\theta'$, of 0.10 period. This occurs even though the wavelength of lower frequency reflected I.F. signal 46 is substantially longer than higher frequency reflected modulation signal 40. A phase detector circuit 48, responsive to local I. F. signal 36 and reflected I.F. signal 46, detects the phase difference, $\theta'$, between the two signals, which represents twice the distance, x, between transmitter 12 and target 16. This phase difference information, $\theta'$, is output on line 50 to controller 52 for further processing. The details of phase detector 48 are fully disclosed in co-pending U.S. patent application Ser. No. 09/196,016, filed on Nov. 19, 1998, and, therefore, the contents of that co-pending application are hereby incorporated by reference into this disclosure.

Since the phase difference, $\theta'$, of reflected I.F. signal 46 corresponds to twice the distance, 2x, of target 16, $\frac{1}{2}\theta'$ corresponds to the actual distance, x, of target 16. Accordingly, any change in phase difference, $\Delta\theta'$, corresponds to change in twice the target distance, $\Delta 2x$. By monitoring this change in phase difference, $\Delta\theta'$, the corresponding change in target distance (or displacement) can easily be determined. This target displacement, $\Delta x$, on line 57 is provided to display circuitry 58. A typical embodiment of display circuitry 58 would be any traditional display means such as liquid crystal displays, cathode ray tubes, light emitting diodes, etc.

In one embodiment, laser displacement measuring system 10 includes a controller 52 for selectively changing, via control signals on lines 76, the frequency of R.F. transmitter oscillator 18 and R.F. local oscillator 28 by the same amount from their original frequencies to a second set of frequencies. The amount that the oscillation frequency of each oscillator 18 and 28 is shifted is numerically the same (e.g. 1.00 megahertz). This shifting of the oscillation frequencies of R.F. transmitter oscillator 18 and R.F. local oscillator 28 enables determination of the distance or absolute range, x, between transmitter 12 and target 16 through the use of range detector 54 incorporated into controller 52. The use of two separate and distinct oscillation frequencies allows for the determination of absolute range using only one optical path, as opposed to the prior art system which utilizes two separate optical paths. This absolute range, x, of the target is provided to display circuitry 58 on line 56.

Figure 2:
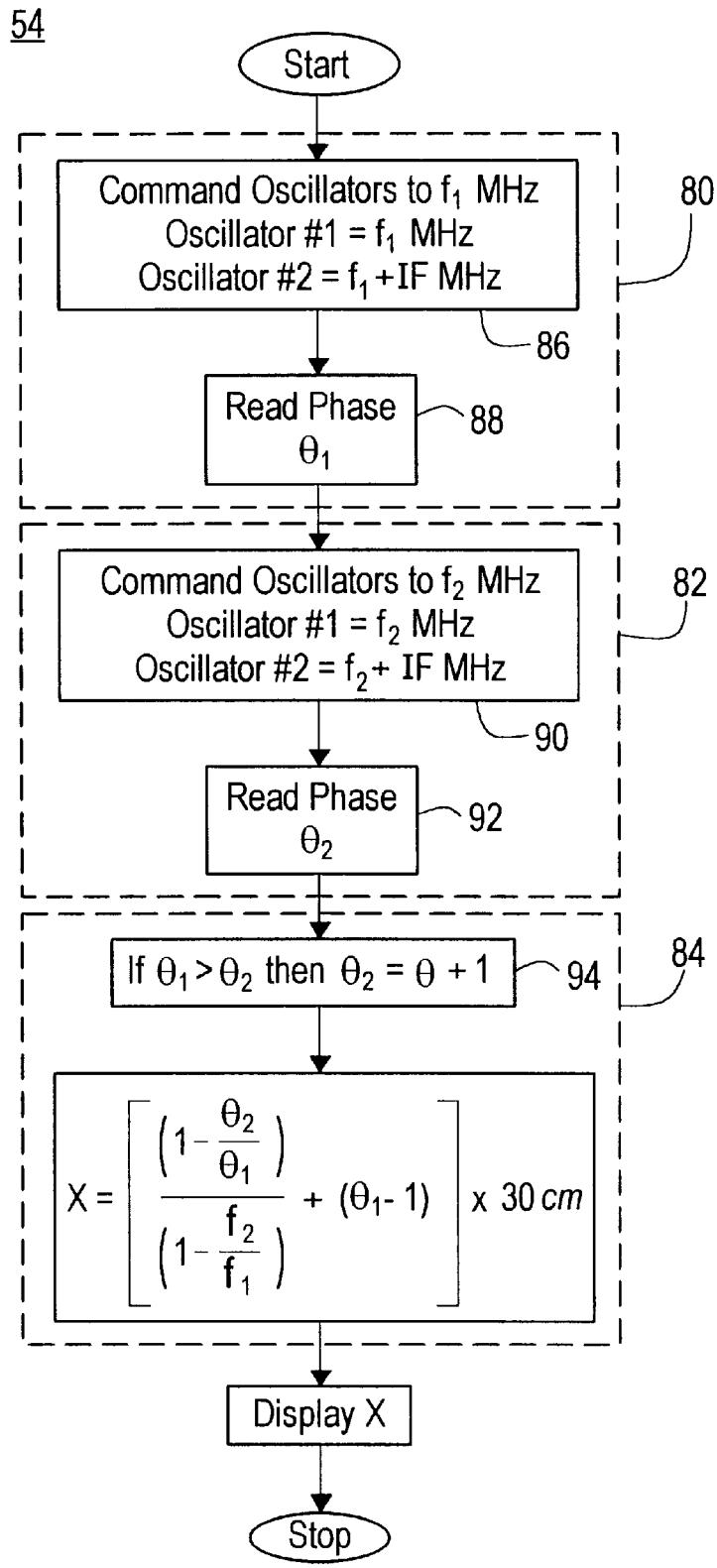
FIG. 2 is a block diagram of the range detector according to this invention.

Range detector 54, FIG. 2, performs the steps of determining a first phase difference, $\theta_1$, 80 between the local and reflected I.F. signals at the first and second frequencies, determining a second phase difference, $\theta_2$, 82 between the local and reflected I.F. signals at a second set of frequencies, and calculating the absolute range of the target 84. The second set of frequencies includes a third and a fourth frequency where the third frequency is typically 1010. 10 Mhz and the fourth frequency is typically 1014.60 Mhz. The step of determining the first phase difference 80 includes commanding 86 the R.F. transmitter oscillator and the R.F. local oscillator to the first and second frequencies, and reading 88 the first phase difference, $\theta_1$. The step of determining the second phase difference 82 includes commanding 90 the R.F. transmitter oscillator and R.F. local oscillator to a second set of frequencies, and reading 92 the second phase difference, $\theta_2$. The step of calculating the absolute range of the target 84 includes the step of incrementing the second phase difference by one 94 if the first phase difference is greater than the second phase difference.

The understanding of the operation of range detector 54 is greatly simplified through the use of the following examples. As stated earlier, range detector 54 shifts the oscillation frequencies of the R.F. transmitter oscillator and R.F. local oscillator from a first and second frequency to a third and fourth frequency where a phase difference measurement is made before and after the frequency shift. This enables range detector 54 to determine phase difference at two different frequencies. These two phase difference measurements are then used in the following equation to determine absolute range.

$$x = \left[ \frac{\left(1 - \frac{\theta_2}{\theta_1}\right)}{\left(1 - \frac{f_2}{f_1}\right)} + (\theta_1 - 1) \right] \times 30 \, \text{cm} \quad (1)$$

For each of the following examples, it is known the wavelength of 1000.00 Mhz radiation traveling through free space is 30 cm.

EXAMPLE 1

The step of determining the first phase difference 80 commands the oscillators 86 to 1000.00 Mhz and 1004.50 Mhz. Reading step 88 determines the first phase difference, $\theta_1$, to be 0.75 cycles. The step of determining the second phase difference 82 then commands the oscillators 90 to 1010.10 Mhz and 1014.60 Mhz and reading step 92 determines the second phase difference, $\theta_2$, to be 0.7725 cycles. The step of incrementing the second phase difference 94 determines that the first phase difference (0.75) is less than the second phase difference (0.7725) and, therefore, does not increment the second phase difference by one. These phase difference and frequency values are then used in Equation 1 to determine the absolute range of the target as follows:

$$x = \left[ \frac{1 - \left(\frac{.7725}{.75}\right)}{1 - \left(\frac{1010.10}{1000.00}\right)} + (0.75 - 1) \right] \times 30 \, \text{cm}$$

x=[2.72]×30 cm x=81.60 cm

EXAMPLE 2

The step of determining the first phase difference 80 commands the oscillators 86 to 1000.00 Mhz and 1004.50 Mhz. Reading step 88 determines the first phase difference, $\theta_1$, to be 0.99 cycles. The step of determining the second phase difference 82 then commands the oscillators 90 to 1010.10 Mhz and 1014.60 Mhz and reading step 92 determines the second phase difference, $\theta_2$, to be 0.0197 cycles. The step of incrementing the second phase difference 94 determines that the first phase difference (0.99) is indeed greater than the second phase difference (0.0197) and, therefore, increments the value of the second phase difference by one for a total of 1.0197 cycles. These phase difference and frequency values are then used in Equation 1 to determine the absolute range of the target as follows:

$$x = \left[ \frac{1 - \left(\frac{1.0197}{0.99}\right)}{1 - \left(\frac{1010.10}{1000.00}\right)} + (.99 - 1) \right] \times 30 \, \text{cm}$$

x=[2.96]×30 cm x=88.80 cm

The basis for the step of incrementing the second phase difference 94 is to compensate for phase shift greater than one complete cycle, where accurate determination of absolute range is difficult. Specifically, it is well known in the art that as a pair of radiation signals (i.e. the modulation signal and the R.F. signal) are shifted from a lower set of frequencies (i.e. 1000.00 Mhz and 1004.5 Mhz) to a higher set of frequencies (1010.10 Mhz and 1014.60 Mhz), the measured phase difference between the signals will increase. However, there are situations in which the first measured phase difference, $\theta_1$, is so close to one complete cycle of phase shift that the slight increase in frequency results in the second measured phase difference, $\theta_2$, being slightly greater than one complete wavelength. This results in a second phase difference measurement, $\theta_2$, which is very close to zero, since the integer part of the phase difference is truncated. Therefore, the second measured phase difference, $\theta_2$, would have a value which is less than the first measured phase difference, $\theta_1$, due to truncation, when the value of the second measured phase difference is actually one complete cycle higher than actually measured. When this occurs, it is known that the measured phase difference has shifted from a value slightly less than one complete cycle (i.e. 0.999) to a value slightly greater than one complete cycle (i.e. 1.001). Therefore, the step of incrementing the second phase difference 94 increases the value of the second measured phase difference, $\theta_2$, so that it properly reflects the total phase difference in relation to the first measured phase difference, $\theta_1$. Range detector 54 is a software routine executed by a computer.

Figure 3:
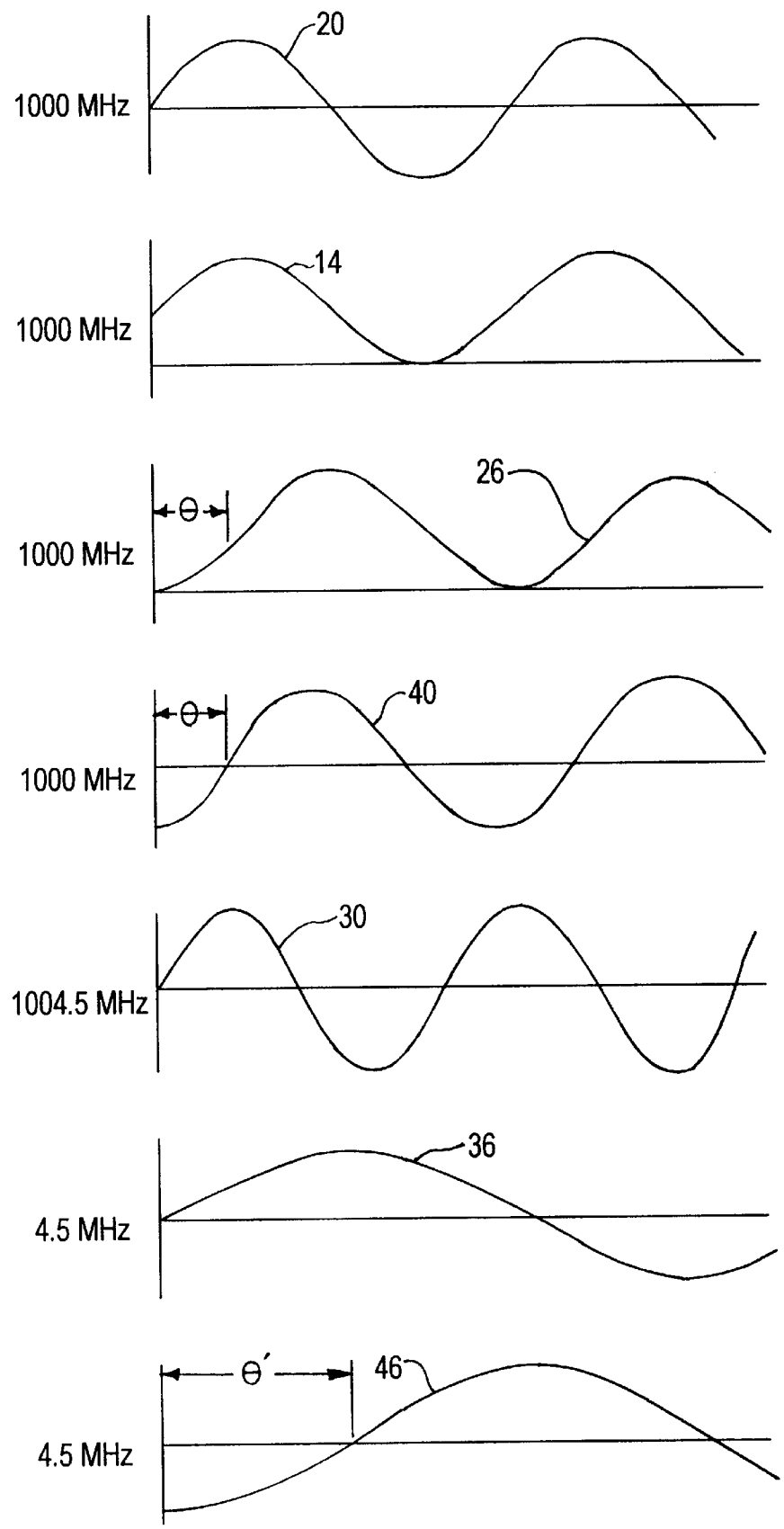
FIG. 3 illustrates a number of waveforms occurring in the laser displacement measurement system according to this invention.

A better understanding of the laser displacement measurement system according to this invention can be achieved through the use of the enlarged and aligned waveforms of FIG. 3. During operation of the laser displacement measurement system, amplitude modulation signal 20 is generated by an R.F. transmitter oscillator and provided to a radiation source. This amplitude modulation signal 20 is used to excite the radiation source to generate modulated radiation 14. Modulated radiation 14 is transmitted to a target and reflected off the target back towards a radiation receiver. Reflected modulated radiation 26, sensed by the radiation receiver, includes a phase shift component $\theta$. The radiation receiver, upon sensing reflected modulated radiation 26 generates reflected modulation signal 40 which includes the same phase shift component $\theta$ as reflected modulated radiation 26. Modulation signal 20 is mixed, via a first mixing circuit, with a second R.F. signal 30 to produce local I.F. signal 36. Local I.F. signal 36 represents the difference, in frequency, between R.F. signal 30 and modulation signal 20. Reflected modulation signal 40 is mixed, via a second mixer circuit, with R.F. signal 30 to produce reflected I.F. signal 46.

Reflected I.F. signal 46 includes a phase shift component $\theta'$ which is the fractional equivalent of the phase shift component $\theta$ in reflected modulation signal 40. While reflected modulation signal 40 and reflected I.F. signal 46 are at different frequencies, the fractional phase shift component (e.g. the fraction of the period shifted) remains the same.

Specifically, if reflected modulation signal 40 is at 1000 Mhz and the fractional phase shift component, θ, is 0.50 periods, reflected I.F. signal 46, which may have a frequency of 4.5 Mhz, would have a phase shift component, θ', equivalent to the same fractional component, namely 0.50 periods. The fact that these signals are at two different frequencies and, therefore, the wavelengths of the signals are different, has no impact on the fractional phase shift component. As stated earlier, this fractional phase shift component is indicative of twice the distance between the radiation transmitter and the target upon which the radiation is reflected, since it indicates the phase shift induced to during the complete round-trip flight of the radiation.

It should be appreciated that these are only a few embodiments of the specific invention and that this system could be constructed using any combination of hardware/firmware components and software-based sub-routines.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A laser displacement measurement system comprising:
    a radiation source for transmitting radiation to a target;
    an R.F. transmitter oscillator for modulating the amplitude of said radiation at a first frequency;
    a detector for sensing the radiation reflected from the target;
    an R.F. local oscillator for providing an R.F. signal at a second frequency;
    a first mixer circuit, responsive to said oscillators, for providing a local I.F. signal which is the difference between said first and second frequencies;
    a second mixer circuit, responsive to said detector and said R.F. local oscillator, for providing a reflected I.F. signal which is the difference between said second frequency and the modulation frequency of said reflected radiation; and
    a phase detector, responsive to said local and reflected I.F. signals, for detecting a first phase difference between said signals, representative of the distance of the target.

2. The laser displacement measurement system of claim 1 further including a controller for selectively changing the frequency of both said oscillators by the same amount from the first and second frequencies to a second set of frequencies.

3. The laser displacement measurement system of claim 2 in which said controller includes a range detector, responsive to said first phase difference, said first and second frequencies, and said second set of frequencies, for calculating the absolute range of said target.

4. The laser displacement measurement system of claim 3 in which said range detector includes: means for determining said first phase difference between said local and reflected I.F. signals at said first and second frequencies; means for determining a second phase difference between said local and reflected I.F. signals at said second set of frequencies; and means for calculating the absolute range of said target.

5. The laser displacement measurement system of claim 4 in which said second set of frequencies includes a third and fourth frequency and said first frequency is 1000.00 Mhz, said second frequency is 1004.50 Mhz, said third frequency is 1010.10 Mhz, and said fourth frequency is 1014.60 Mhz.

6. The laser displacement measurement system of claim 4 in which said means for determining said first phase difference includes: means for commanding said oscillators to said first and second frequencies; and means for reading said first phase difference.

7. The laser displacement measurement system of claim 4 in which said means for determining a second phase difference includes: means for commanding said oscillators to said second set of frequencies; and means for reading said second phase difference.

8. The laser displacement measurement system of claim 4 in which said means for calculating the absolute range of said target includes means for incrementing said second phase difference by one when said first phase difference is greater than said second phase difference.

9. The laser displacement measurement system of claim 4 in which said range detector is a software routine.

10. The laser displacement measurement system of claim 4 in which said controller includes a range detector, responsive to said first phase difference, said first and second frequencies, and said second set of frequencies, for calculating the absolute range of said target.

11. A laser displacement measurement system comprising:
    a radiation source for transmitting radiation to a target;
    an R. F. transmitter oscillator for modulating the amplitude of said radiation at a first frequency;
    a detector for sensing the radiation reflected from the target;
    an R.F. local oscillator for providing an R.F. signal at a second frequency;
    a first mixer circuit, responsive to said oscillators, for providing a local I.F. signal which is the difference between said first and second frequencies;
    a second mixer circuit, responsive to said detector and said R.F. local oscillator, for providing a reflected I.F. signal which is the difference between said second frequency and the modulation frequency of said reflected radiation;
    a phase detector, responsive to said local and reflected I.F. signals, for detecting a first phase difference between said signals representative of the distance of the target; and
    a controller for selectively changing the frequency of both said oscillators by the same amount from the first and second frequencies to a second set of frequencies.

* * * * *

UNITED STATES PATENT AND TRADEMARK OFFICE
CERTIFICATE OF CORRECTION

PATENT NO.    : 6,100,540
DATED         : August 8, 2000
INVENTOR(S)   : Ducharme et al.

It is certified that error appears in the above-identified patent and that said Letters Patent is hereby corrected as shown below:

Column 8,
Lines 27-28, "10. The laser displacement measurement system of claim 4" should read
-- 11. The laser displacement measurement system of claim 10 --.
Line 32, "11. A laser displacement measurement system" should read
-- 10. A laser displacement measurement system --.

Signed and Sealed this

Thirtieth Day of September, 2003

JAMES E. ROGAN
*Director of the United States Patent and Trademark Office*